(12) United States Patent
Cho et al.

(10) Patent No.: US 9,298,505 B2
(45) Date of Patent: Mar. 29, 2016

(54) TIME AND SPACE-DETERMINISTIC TASK SCHEDULING APPARATUS AND METHOD USING MULTI-DIMENSIONAL SCHEME

(71) Applicant: ELECTRONICS AND TELECOMMUNICATIONS RESEARCH INSTITUTE, Daejeon (KR)

(72) Inventors: Moon Haeng Cho, Daejeon (KR); JongJin Won, Daejeon (KR); CheolOh Kang, Daejeon (KR); JeongSeok Lim, Daegu (KR)

(73) Assignee: ELECTRONICS AND TELECOMMUNICATIONS RESEARCH INSTITUTE, Daejeon (KR)

( * ) Notice: Subject to any disclaimer, the term of this patent is extended or adjusted under 35 U.S.C. 154(b) by 0 days.

(21) Appl. No.: 14/468,957

(22) Filed: Aug. 26, 2014

(65) Prior Publication Data
US 2015/0135184 A1    May 14, 2015

(30) Foreign Application Priority Data
Nov. 13, 2013 (KR) .................. 10-2013-0137398

(51) Int. Cl.
*G06F 9/46* (2006.01)
*G06F 9/48* (2006.01)

(52) U.S. Cl.
CPC ........ *G06F 9/4881* (2013.01); *G06F 2209/486* (2013.01)

(58) Field of Classification Search
CPC .................................................. G06F 9/4881
USPC ........................................................ 718/103
See application file for complete search history.

(56) References Cited

U.S. PATENT DOCUMENTS

| | | | |
|---|---|---|---|
| 6,757,897 B1* | 6/2004 | Shi ........................ | G06F 9/4843 710/240 |
| 2002/0032715 A1* | 3/2002 | Utsumi ................. | G06F 9/3851 718/103 |
| 2003/0187905 A1* | 10/2003 | Ambilkar ............ | G06F 9/30101 718/100 |

(Continued)

FOREIGN PATENT DOCUMENTS

| KR | 10-2000-0037391 A | 5/2003 |
|---|---|---|
| KR | 10-2012-0067502 A | 6/2012 |

OTHER PUBLICATIONS

"Time Map Scheduling"; An IP.com Prior Art Database Technical Disclosure; 1973.*

(Continued)

*Primary Examiner* — Qing Chen
*Assistant Examiner* — Clint Thatcher
(74) *Attorney, Agent, or Firm* — LRK Patent Law Firm

(57) ABSTRACT

A time and space-deterministic task scheduling apparatus and method using a multi-dimensional scheme are disclosed. The time and space-deterministic task scheduling apparatus includes a preparation list generation unit and a task insertion unit. The preparation list generation unit generates a preparation list, including a preparation table having an array structure configured to have each bit formed of a binary number indicative of a priority of a task, and also including a preparation group cluster configured to include a plurality of preparation groups, each including bits corresponding to the respective binary numbers of the preparation table, and to have an upper and lower dimension relationship between the plurality of preparation groups. The task insertion unit performs bit masking on the preparation group cluster and the preparation table corresponding to a task P having a specific priority and thus inserts the task into the preparation group cluster and the preparation table.

14 Claims, 8 Drawing Sheets

(56) References Cited

U.S. PATENT DOCUMENTS

| | | | | |
|---|---|---|---|---|
| 2007/0083871 A1* | 4/2007 | McKenney | ........... | G06F 9/4887 718/105 |
| 2013/0074088 A1* | 3/2013 | Purcell | ................. | G06F 9/4881 718/103 |
| 2014/0281088 A1* | 9/2014 | VanderLeest | ........... | G06F 13/26 710/264 |

OTHER PUBLICATIONS

Sun-Jin Oh et al., "Deterministic Task Scheduling for Embedded Real-Time Operating Systems," IEICE Transaction, 2004.

Myoung-Jo Jung et al., "Deterministic Task Scheduling Algorithm using a Multi-Dimensional Methodology for Embedded Real-Time Operating Systems," ICITA Conference, 2008.

* cited by examiner

TASK PRIORITY

```
/* Mapping Table to Map Bit Position to Bit Mask */
char const MapTbl[4]={ 0x01, 0x02, 0x04, 0x08 };

/* Priority Resolution Table */
char const UnMapTbl[16]
    ={ 0, 0, 1, 0, 2, 0, 1, 0, 3, 0, 1, 0, 2, 0, 1, 0 };
```

```
RdyGrp | =MapTbl[p>>6];
RdyMidGRP1[p>>6] | =MapTbl[(p&0x30)>>4];
RdyMidGRP2[p>>6] [(p&0x30)>>4] | =MapTbl[(p&0x0C)>>2];
RdyTbl[p>>6] [(p&0x30)>>4] [(p&0x0C)>>2] | =MapTbl[p&0x03];
```

FIG. 11

```
z = UnMapTbl[RdyGrp];
y = UnMapTbl[RdyMidGrp1[z]];
x = UnMapTbl[RdyMidGrp2[z][y]];
w = UnMapTable[RdyTbl[z][y][x]];
q = (z<<6)+(y<<4)+(x<<2)+w;
```

FIG. 12

```
if((RdyTbl[r>>6] [r&0x30)>>4] [(r&0xc)>>2]
                    &=~MapTbl[r&0x03])==0)

if((RdyMidGrp2[r>>6] [r&0x30)>>4]
                    &=~MapTbl[r&0x0C>>2])==0)

if((RdyMidGrp1[r>>6] &=~MapTbl[r&0x30)>>4])==0)
         RdyGrp &=~MapTbl[r>>6]
```

FIG. 13

TIME AND SPACE-DETERMINISTIC TASK SCHEDULING APPARATUS AND METHOD USING MULTI-DIMENSIONAL SCHEME

CROSS-REFERENCE TO RELATED APPLICATION

This application claims the benefit of Korean Patent Application No. 10-2013-0137398, filed Nov. 13, 2013, which is hereby incorporated by reference in its entirety into this application.

BACKGROUND OF THE INVENTION

1. Technical Field

The present invention relates generally to a time and space-deterministic task scheduling apparatus and method using a multi-dimensional scheme and, more particularly, to a time and space-deterministic task scheduling apparatus and method using a multi-dimensional scheme, wherein tasks are scheduled in real time by ensuring that time and space complexity is always O(1) regardless of the extension of priorities in a system having considerably limited hardware resources, such as, a wearable personal computer (PC).

2. Description of the Related Art

A wearable PC is a computer having a PC function contained within clothing.

More specifically, a wearable PC started to be developed for U.S. military training, and the application range of wearable PCs has gradually expanded to fashions, mobile communication devices and digital products in addition to daily life applications. A wearable PC is a future computing technology that may be successfully achieved only when it is researched in close association with several fields, such as mechanics, physics, textiles (e.g., advanced materials, designs, and fashions), ergonomics and psychology, in addition to a computer technology. "Smart clothing," that is, a new type of next-generation clothing in which various types of digital devices and functions for future daily life are integrated into clothes, also has many things in common with a wearable computer.

In order to support various services required by users as in a conventional PC, a real-time operating system (OS) capable of predicting the execution times of respective kernel services needs to be used in a wearable PC in order to overcome an increase in the complexity of applications installed on a system and the limitation of hardware resources, such as the structural CPU performance of a wearable PC, the capacity of memory and the capacity of a battery, and to guarantee a user's quality of service (QoS).

A real-time OS needs to be configured such that the deadlines of all real-time tasks are satisfied and a priority reversal phenomenon in which a task having a low priority occupies a CPU when a task having a high priority in an execution preparation state is present is prevented to ensure time determinism. For this purpose, a real-time OS requires a task scheduling algorithm that ensures time determinism regardless of priority, but a conventional algorithm experiences memory overhead attributable to the extension of priorities.

Accordingly, there is a need for a time and space-deterministic task scheduling apparatus and method using a multi-dimensional scheme, which schedule tasks in real time by ensuring that time and space complexity is always O(1) regardless of the extension of priorities in a system having considerably limited hardware resources, such as a wearable PC. Korean Patent Application Publication No. 10-2000-0037391 discloses a related technology.

SUMMARY OF THE INVENTION

Accordingly, the present invention has been made keeping in mind the above problems occurring in the conventional art, and an object of the present invention is to implement a time and space-deterministic task scheduling apparatus and method using a multi-dimensional scheme, which ensure that time and space complexity is always O(1) regardless of the extension of priorities in a system having considerably limited hardware resources, such as a wearable PC.

Another object of the present invention is to ensure that space complexity is O(1) by requesting only a constant memory space without memory overhead attributable to the extension of priorities and to enable the location of a task, to which the highest priority has been assigned, to be always detected at a fixed and constant time because a fixed instruction is always executed regardless of the number of tasks when task scheduling is performed.

In accordance with an aspect of the present invention, there is provided a time and space-deterministic task scheduling apparatus using a multi-dimensional scheme, including a preparation list generation unit configured to generate a preparation list, including a preparation table having an array structure configured to have each bit formed of a binary number indicative of a priority of a task, and also including a preparation group cluster configured to include a plurality of preparation groups, each including bits corresponding to the respective binary numbers of the preparation table, and also configured to have an upper and lower dimension relationship between the plurality of preparation groups; and a task insertion unit configured to perform bit masking on the preparation group cluster and the preparation table corresponding to a task P having a specific priority and thus insert the task into the preparation group cluster and the preparation table; wherein the task P having a specific priority includes a bit indicative of a location in each of the plurality of preparation groups having an upper and lower dimension relationship and a bit indicative of a location in the preparation table.

The preparation list generation unit may be further configured to form a first preparation group, that is, a preparation group having a highest dimension of the preparation group cluster, using 4 bits; to form a second preparation group corresponding to a next higher dimension, that is, a lower dimension of the first preparation group formed of 4 bits, with respect to each bit of the first preparation group; to form a third preparation group corresponding to a next lower dimension, that is, a lower dimension of the second preparation group formed of 4 bits, with respect to each bit of the second preparation group; and to generate the preparation list by setting a specific bit of the first preparation group to 1 in order to indicate that a task in an execution preparation state is present in the first preparation group if a value of any one of the bits of the second preparation group, the third preparation group and the preparation table corresponding to the specific bit of the first preparation group is 1.

The preparation list generation unit may be further configured to classify the task P, having a specific priority formed of 8 bits, into pairs of 2 bits, and to generate the preparation list so that the task P is mapped to each of the first preparation group, the second preparation group, the third preparation group and the preparation table in accordance with a value of each of four 2 bits.

The task insertion unit may be further configured to perform, based on the map table having an array structure stored in a repository in order to enable performance without requiring sequential search of the preparation list, first insertion execution for performing bit masking on the first preparation group in accordance with a value of the map table in which a value of highest 2 bits of the task P having a specific priority has been indexed; second insertion execution for performing bit masking on the second preparation group in accordance with a value of the map table in which a value of next higher 2 bits of the task P having a specific priority has been indexed; third insertion execution for performing bit masking on the third preparation group in accordance with a value of the map table in which a value of next lower 2 bits of the task P having a specific priority has been indexed; and fourth insertion execution for performing bit masking on the preparation table in accordance with a value of the map table in which a value of lowest 2 bits of the task P having a specific priority has been indexed.

The time and space-deterministic task scheduling apparatus may further include a task selection unit configured to select a task Q having a highest priority from the preparation table in accordance with a change in the preparation table.

The task selection unit may be further configured to perform, based on an unmap table that is a priority transform table for detecting the task Q having a highest priority in order to perform execution without performing comparison between all tasks of the preparation list, first selection execution for calculating a value of highest 2 bits of the task Q having the highest priority in accordance with a value of the unmap table in which a value of the first preparation group has been indexed; second selection execution for calculating a value of next higher 2 bits of the task Q having the highest priority in accordance with a value of the unmap table in which a value of the second preparation group has been indexed; third selection execution for calculating a value of next lower 2 bits of the task Q having the highest priority in accordance with a value of the unmap table in which a value of the third preparation group has been indexed; fourth selection execution for calculating a value of lowest 2 bits of the task Q having the highest priority in accordance with a value of the unmap table in which the preparation table value has been indexed; and fifth selection execution for determining a task having a highest priority based on the value of the highest 2 bits, the value of the next higher 2 bits, the value of the next lower 2 bits, and the value of the lowest 2 bits.

The fifth selection execution may be configured such that the task having a highest priority is determined by adding a value obtained by left shifting the value of the highest 2 bits by 6 bits, a value obtained by left shifting the value of the next higher 2 bits by 4 bits, a value obtained by left shifting the value of the next lower 2 bits by 2 bits, and the value of the lowest 2 bits.

The time and space-deterministic task scheduling apparatus may further include a task execution unit configured to assign a CPU to the task Q having a highest priority, and to execute the task Q having a highest priority.

The time and space-deterministic task scheduling apparatus may further include a task deletion unit configured to delete a task R, that is, a task whose execution has been terminated or stopped, from the preparation list.

The task deletion unit may be further configured to perform, based on the map table having an array structure stored in a repository in order to enable performance without requiring sequential search of the preparation list, first deletion execution for unmasking the preparation table in accordance with a value of the map table in which a value of lowest 2 bits of the task R to be deleted has been indexed; second deletion execution for unmasking the third preparation group in accordance with a value of the map table in which a value of next lower 2 bits of the task R to be deleted has been indexed if a result of the first deletion execution is 0; third deletion execution for unmasking the second preparation group in accordance with a value of the map table in which a value of next higher 2 bits of the task R to be deleted has been indexed if a result of the second deletion execution is 0; and fourth deletion execution for unmasking the first preparation group in accordance with a value of the map table in which a value of the highest 2 bits of the task R to be deleted has been indexed if a result of the third deletion execution is 0.

In accordance with another aspect of the present invention, there is provided a time and space-deterministic task scheduling method using a multi-dimensional scheme, including generating, by a preparation list generation unit, a preparation list, including a preparation table having an array structure configured to have each bit formed of a binary number indicative of a priority of a task, and also including a preparation group cluster configured to include a plurality of preparation groups, each including bits corresponding to the respective binary numbers of the preparation table, and also configured to have an upper and lower dimension relationship between the plurality of preparation groups; and performing, by a task insertion unit, bit masking on the preparation group cluster and the preparation table corresponding to a task P having a specific priority and thus inserting the task into the preparation group cluster and the preparation table; wherein the task P having a specific priority comprises a bit indicative of a location in each of the plurality of preparation groups having an upper and lower dimension relationship and a bit indicative of a location in the preparation table.

Generating the preparation list may include forming a first preparation group, that is, a preparation group having a highest dimension of the preparation group cluster, using 4 bits; forming a second preparation group corresponding to a next higher dimension, that is, a lower dimension of the first preparation group formed of 4 bits, with respect to each bit of the first preparation group; forming a third preparation group corresponding to a next lower dimension, that is, a lower dimension of the second preparation group formed of 4 bits, with respect to each bit of the second preparation group; and generating the preparation list by setting a specific bit of the first preparation group to 1 so that a task in an execution preparation state is present in the first preparation group if a value of any one of the bits of the second preparation group, the third preparation group, and the preparation table corresponding to the specific bit of the first preparation group is 1.

Generating the preparation list may include classifying the task P, having a specific priority formed of 8 bits, into pairs of 2 bits, and generating the preparation list so that the task P is mapped to each of the first preparation group, the second preparation group, the third preparation group and the preparation table in accordance with a value of each of four 2 bits.

Inserting the task into the preparation group cluster and the preparation table may include, based on the map table having an array structure stored in a repository in order to enable performance without requiring sequential search of the preparation list, performing first insertion execution for performing bit masking on the first preparation group in accordance with a value of the map table in which a value of highest 2 bits of the task P having a specific priority has been indexed; performing second insertion execution for performing bit masking on the second preparation group in accordance with a value of the map table in which a value of next higher 2 bits of the task P having a specific priority has been indexed; performing third insertion execution for performing bit masking on the third preparation group in accordance with a value of the map table in which a value of next lower 2 bits of the task P having a specific priority has been indexed; and performing fourth insertion execution for performing bit masking on the preparation table in accordance with a value of the map table in which a value of lowest 2 bits of the task P having a specific priority has been indexed.

The time and space-deterministic task scheduling method may further include selecting a task Q having a highest priority from the preparation table in accordance with a change in the preparation table.

Selecting the task Q may include, based on an unmap table that is a priority transform table for detecting the task Q having the highest priority in order to perform execution without performing comparison between all tasks of the preparation list, performing first selection execution for calculating a value of highest 2 bits of the task Q having the highest priority in accordance with a value of the unmap table in which a value of the first preparation group has been indexed; performing second selection execution for calculating a value of next higher 2 bits of the task Q having the highest priority in accordance with a value of the unmap table in which a value of the second preparation group has been indexed; performing third selection execution for calculating a value of next lower 2 bits of the task Q having the highest priority in accordance with a value of the unmap table in which a value of the third preparation group has been indexed; performing fourth selection execution for calculating a value of lowest 2 bits of the task Q having the highest priority in accordance with a value of the unmap table in which the preparation table value has been indexed; and performing fifth selection execution for determining a task having a highest priority based on the value of the highest 2 bits, the value of the next higher 2 bits, the value of the next lower 2 bits, and the value of the lowest 2 bits.

Performing the fifth selection execution may include determining the task having a highest priority by adding a value obtained by left shifting the value of the highest 2 bits by 6 bits, a value obtained by left shifting the value of the next higher 2 bits by 4 bits, a value obtained by left shifting the value of the next lower 2 bits by 2 bits, and the value of the lowest 2 bits.

The time and space-deterministic task scheduling method may further include, after selecting the task Q, assigning, by a task execution unit, a CPU to the task Q having a highest priority, and executing, by the task execution unit, the task Q having a highest priority.

The time and space-deterministic task scheduling method may further include deleting, by a task deletion unit, a task R to be deleted, that is a task whose execution has been terminated or stopped, from the preparation list.

Deleting the task R may include, based on the map table having an array structure stored in a repository in order to enable performance without requiring sequential search of the preparation list, performing first deletion execution for unmasking the preparation table in accordance with a value of the map table in which a value of lowest 2 bits of the task R to be deleted has been indexed; performing second deletion execution for unmasking the third preparation group in accordance with a value of the map table in which a value of next lower 2 bits of the task R to be deleted has been indexed if a result of the first deletion execution is 0; performing third deletion execution for unmasking the second preparation group in accordance with a value of the map table in which a value of next higher 2 bits of the task R to be deleted has been indexed if a result of the second deletion execution is 0; and performing fourth deletion execution for unmasking the first preparation group in accordance with a value of the map table in which a value of the highest 2 bits of the task R to be deleted has been indexed if a result of the third deletion execution is 0.

BRIEF DESCRIPTION OF THE DRAWINGS

The above and other objects, features and advantages of the present invention will be more clearly understood from the following detailed description taken in conjunction with the accompanying drawings, in which:

FIG. 11 is a diagram illustrating pseudo code that is used by a task insertion unit in order to insert a task according to an embodiment of the present invention;

FIG. 12 is a diagram illustrating pseudo code that is used by a task selection unit in order to select a task according to an embodiment of the present invention;

FIG. 13 is a diagram illustrating pseudo code that is used by a task deletion unit in order to delete a task according to, an embodiment of the present invention.

DESCRIPTION OF THE PREFERRED EMBODIMENTS

Figure 1:
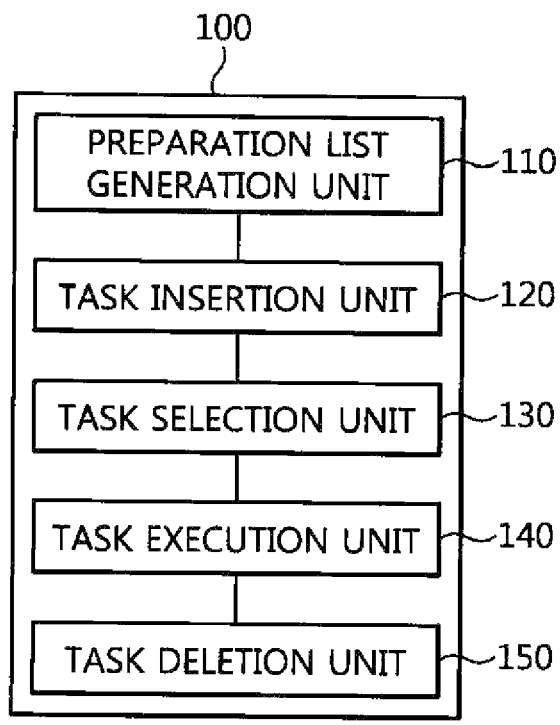
FIG. 1 is a block diagram illustrating a time and space-deterministic task scheduling apparatus using a multi-dimensional scheme according to an embodiment of the present invention.

Embodiments of the present invention are described in detail below with reference to the accompanying drawings. Repeated descriptions and descriptions of known functions and constructions that are deemed to make the gist of the present invention unnecessarily vague are omitted below.

The embodiments of the present invention are provided in order to fully describe the present invention to those skilled in the art. Accordingly, the shapes, sizes, etc. of elements in the drawings may be enlarged for clarity of description.

Furthermore, in the following description, terms, such as the first, the second, A, B, (a) and (b), may be used. However, although these terms are used only to distinguish one element from the other element, the essence, order or sequence of the elements is not limited by the terms.

A time and space-deterministic task scheduling apparatus using a multi-dimensional scheme according to an embodiment of the present invention is described with reference to the accompanying drawings below. In the present invention, a multi-dimensional scheme refers to a scheme having at least three or more dimensions, and, for example, a three-dimensional (3D) case and a four-dimensional (4D) case are described in the present invention. FIG. 1 is a block diagram illustrating a time and space-deterministic task scheduling apparatus using a multi-dimensional scheme according to an embodiment of the present invention.

Referring to FIG. 1, the time and space-deterministic task scheduling apparatus 100 using a multi-dimensional scheme according to this embodiment of the present invention includes a preparation list generation unit 110, a task insertion unit 120, a task selection unit 130, a task execution unit 140, and a task deletion unit 150.

The preparation list generation unit 110 functions to generate a preparation list, including a preparation table having an array structure configured to have each bit formed of a binary number indicative of the priority of a task, and a preparation group cluster formed of a plurality of preparation groups, each including bits corresponding to the respective binary numbers of the preparation table, and configured to have an upper and lower dimension relationship between the plurality of preparation groups.

The task insertion unit 120 functions to perform bit masking on the preparation group cluster and the preparation table corresponding to a task P having a specific priority and thus insert the task into the preparation group cluster and the preparation table.

In this case, the task P having a specific priority includes a bit indicative of a location in each of the plurality of preparation groups having an upper and lower dimension relationship, and a bit indicative of the location in the preparation table. Furthermore, the task P having a specific priority may have higher priority when the task has a lower number.

The case where the time and space-deterministic task scheduling apparatus using a multi-dimensional scheme according to an embodiment of the present invention has been implemented based on a 3D using 4 bits is described as an embodiment of the present invention below.

Figure 2:
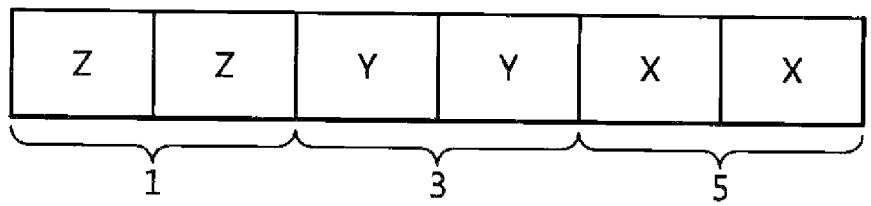
FIG. 2 is a diagram illustrating a 3D-based task priority according to an embodiment of the present invention.
Figures 3, 4:
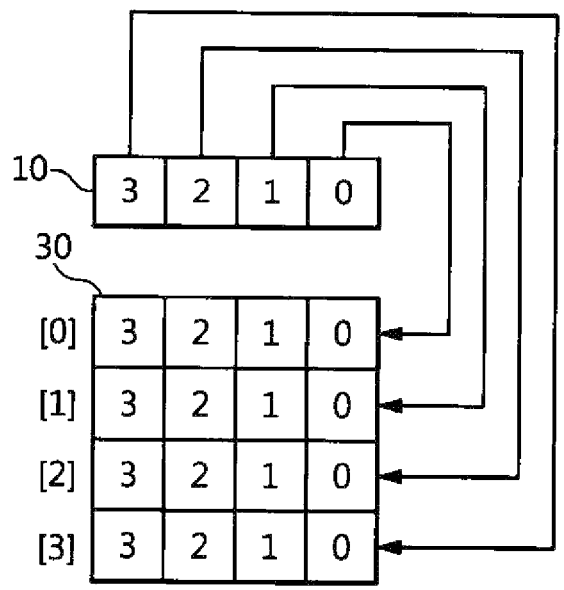
FIG. 3 is a diagram illustrating a 3D-based preparation group cluster in the time and space-deterministic task scheduling apparatus using a 3D scheme according to an embodiment of the present invention.
FIG. 4 is a diagram illustrating a 3D-based preparation table in the time and space-deterministic task scheduling apparatus using a 3D scheme according to an embodiment of the present invention.
Figure 5:
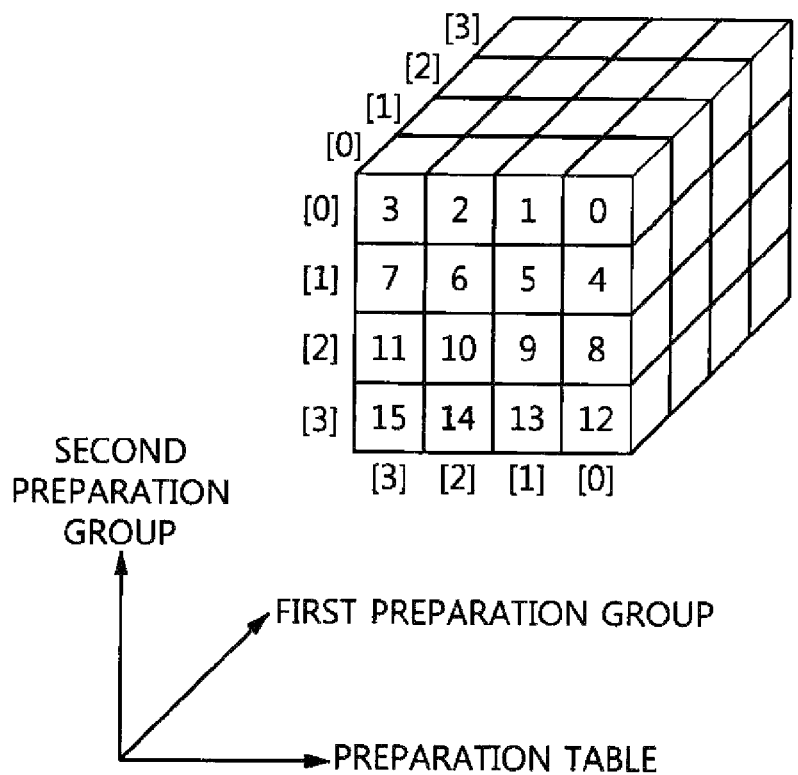
FIG. 5 is a diagram illustrating a 3D-based preparation list in the time and space-deterministic task scheduling apparatus using a 3D scheme according to an embodiment of the present invention.

FIG. 2 is a diagram illustrating a 3D-based task priority according to an embodiment of the present invention. FIG. 3 is a diagram illustrating a 3D-based preparation group cluster in the time and space-deterministic task scheduling apparatus using a 3D scheme according to an embodiment of the present invention. FIG. 4 is a diagram illustrating a 3D-based preparation table in the time and space-deterministic task scheduling apparatus using a 3D scheme according to an embodiment of the present invention. FIG. 5 is a diagram illustrating a 3D-based preparation list in the time and space-deterministic task scheduling apparatus using a 3D scheme according to an embodiment of the present invention.

Referring to FIG. 2, the 3D-based task priority may be implemented using 6 bits, and may be classified into "ZZ" including 2 bits, that is, the highest bits 1; "YY" including 2 bits, that is, the next higher bits 3; and "XX" including two bits, that is, the next lower bits 5.

The preparation list generation unit 110 may form a first preparation group, that is, a preparation group having the highest dimension of the preparation group cluster, using 4 bits, and may form a second preparation group corresponding to the next higher dimension, that is, a lower dimension of the first preparation group formed of 4 bits, with respect to each bit of the first preparation group. In this case, if the value of any one of the bits of the second preparation group and preparation table corresponding to a specific bit of the first preparation group is 1, the preparation list generation unit 110 may generate a preparation list in order to indicate that a task in an execution preparation state is present in the first preparation group by setting the specific bit of the first preparation group to 1.

Referring to FIGS. 2 to 5 together, time complexity 0(1) and space complexity 0(1) are ensured in 64 priority steps 0 to 63 using a map table, an unmap table and the data parameters of a first preparation group 10, a second preparation group 30 and a preparation table 50. In the first preparation group 10, four second preparation groups[ ] 30 are designated as a single group, and each set bit of the first preparation group 10 indicates whether or not the corresponding group has a task in an execution preparation state by setting a corresponding bit of the first preparation group to "1" if any one bit within the single group is "1." Likewise, in the second preparation group[ ] 30, four preparation tables[ ][ ] 50 are designated as a single group, and each bit of the second preparation group indicates whether or, not a task in an execution preparation state is present in the corresponding group.

The case where the time and space-deterministic task scheduling apparatus using a multi-dimensional scheme according to an embodiment of the present invention has been implemented is described based on a 4D using 4 bits as an embodiment of the present invention below.

Figure 6:
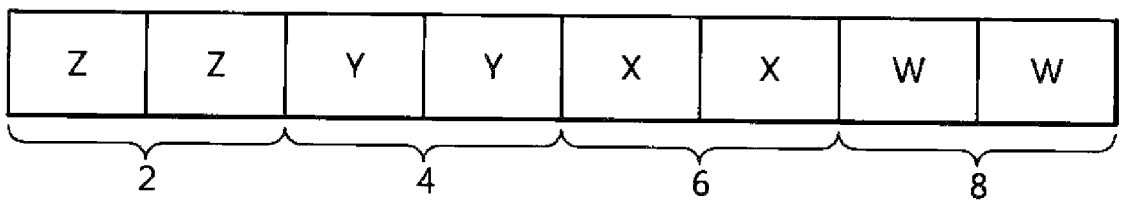
FIG. 6 is a diagram illustrating a 4D-based task priority in the time and space deterministic task scheduling apparatus using a 4D scheme according to an embodiment of the present invention.
Figure 7:
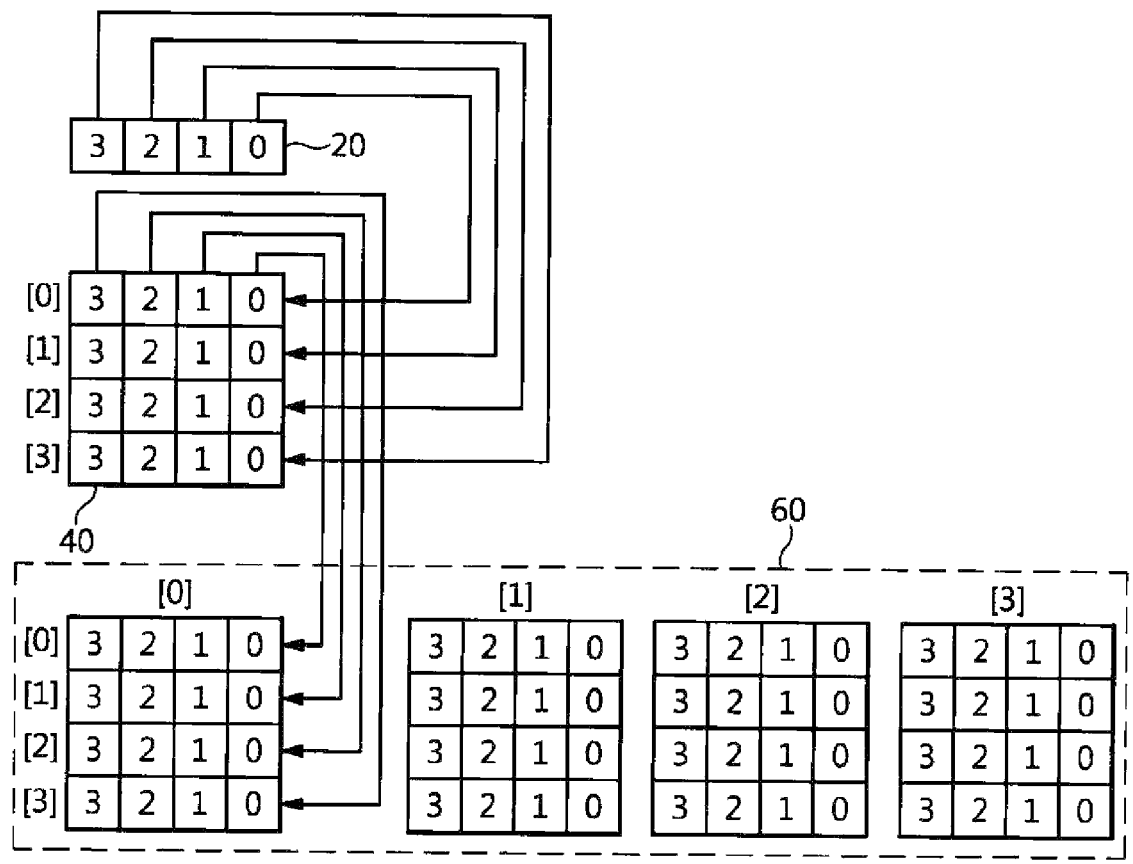
FIG. 7 is a diagram illustrating a 4D-based preparation group cluster in the time and space-deterministic task scheduling apparatus using a 4D scheme according to an embodiment of the present invention.
Figure 8:
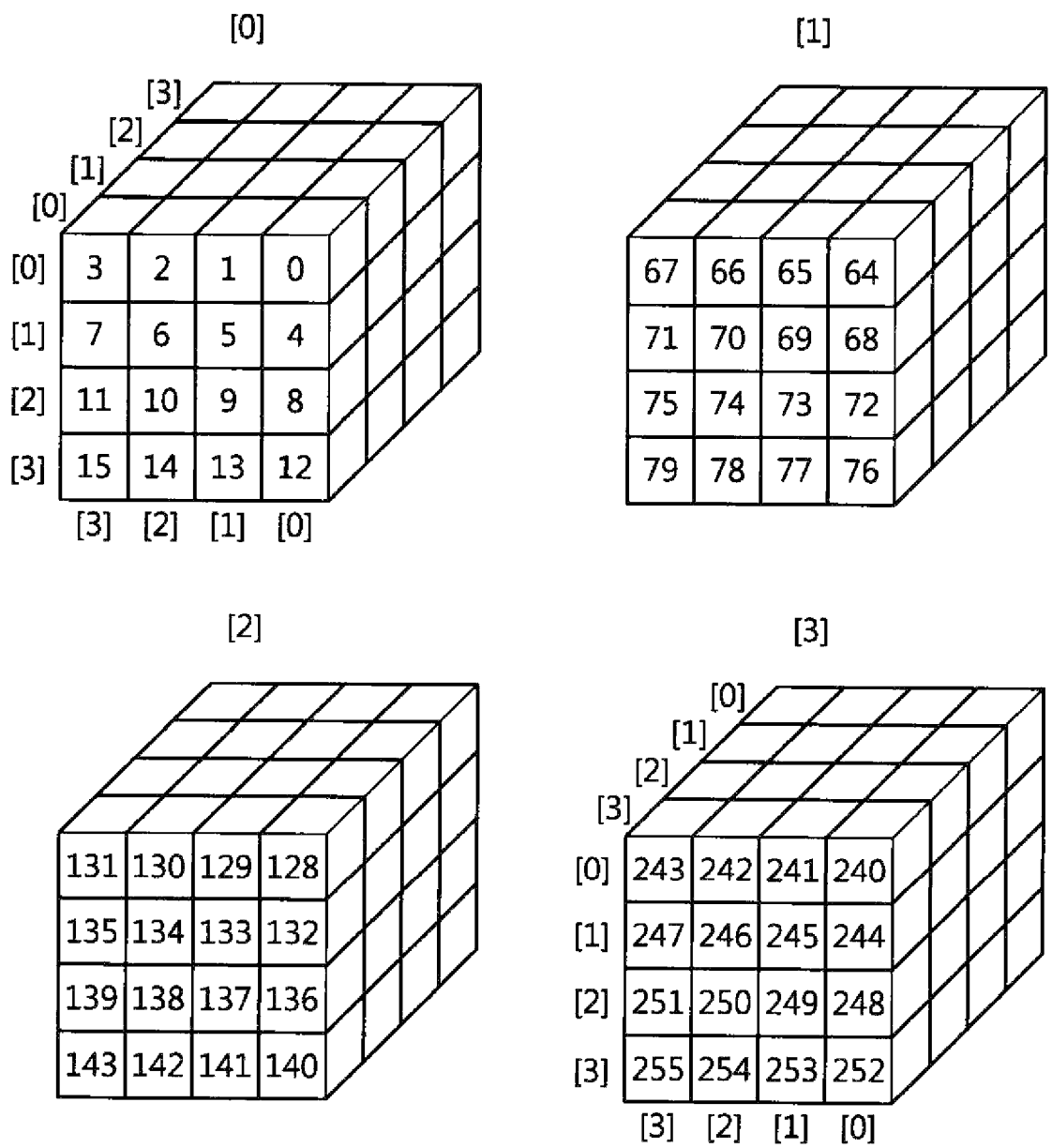
FIG. 8 is a diagram illustrating a 4D-based preparation table in the time and space-deterministic task scheduling apparatus using a 4D scheme according to an embodiment of the present invention.
Figures 9, 10:
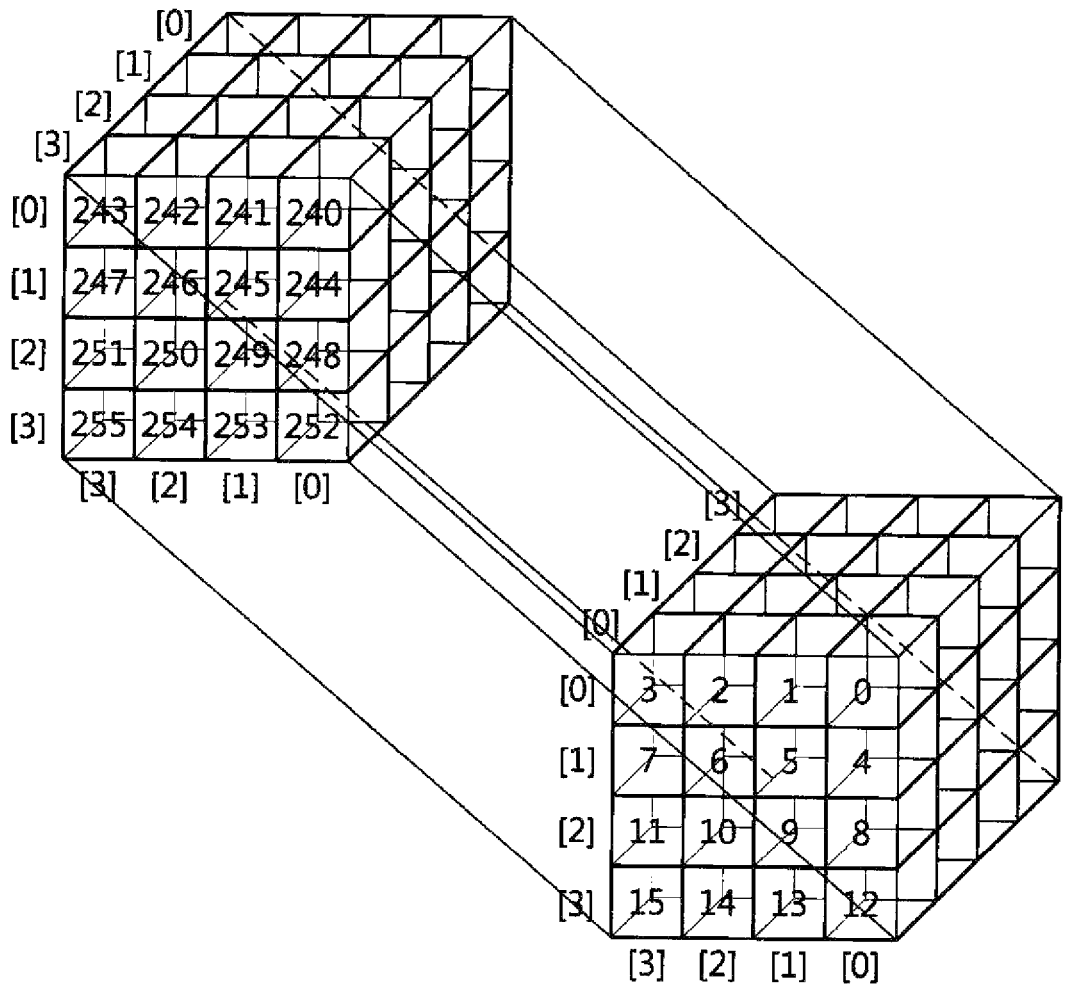
FIG. 9 is a diagram illustrating a 4D-based preparation list in the time and space-deterministic task scheduling apparatus using a 4D scheme according to an embodiment of the present invention.
FIG. 10 is a diagram illustrating a map table and unmap table that are used to insert, select, and delete a task.

FIG. 6 is a diagram illustrating a 4D-based task priority in the time and space-deterministic task scheduling apparatus using a 4D scheme according to an embodiment of the present invention. FIG. 7 is a diagram illustrating a 4D-based preparation group cluster in the time and space-deterministic task scheduling apparatus using a 4D scheme according to an embodiment of the present invention. FIG. 8 is a diagram illustrating a 4D-based preparation table in the time and space-deterministic task scheduling apparatus using a 4D scheme according to an embodiment of the present invention. FIG. 9 is a diagram illustrating a 4D-based preparation list in the time and space-deterministic task scheduling apparatus using a 4D scheme according to an embodiment of the present invention.

Referring to FIG. 6, the 4D-based task priority may be implemented using 8 bits, and may be classified into "ZZ" including 2 bits, that is, the highest bits 2; "YY" including 2 bits, that is, the next higher bits 4; "XX" including 2 bits, that is, the next lower bits 6; and "WW" including 2 bits, that is, the lowest bits 8.

The preparation list generation unit 110 may form a first preparation group, that is, a preparation group having the highest dimension of the preparation group cluster, using 4 bits; may form a second preparation group corresponding to the next higher dimension, that is, the lower dimension of the first preparation group formed of 4 bits, with respect to each bit of the first preparation group; and may form a third preparation group corresponding to the next lower dimension, that is, the lower dimension of the second preparation group formed of 4 bits, with respect to each bit of the second preparation group. In this case, if the value of any one of the bits of the second preparation group, the third preparation group, and the preparation table corresponding to a specific bit of the first preparation group is 1, the preparation list generation unit 110 may generate a preparation list in order to indicate that a task in an execution preparation state is present in the first preparation group by setting the specific bit of the first preparation group to 1.

Referring to FIGS. 6 to 9, time complexity O(1) and space complexity O(1) are ensured in 256 priority steps 0 to 255 using a map table, an unmap table and the data parameters of a first preparation group 20, a second preparation group 40, a third preparation group 60 and a preparation table 80. In the first preparation group 20, 4 second preparation groups[ ] 40 are designated as a single group, and each bit of the first preparation group 20 indicates whether or not a task in an execution preparation state is present in the corresponding group. Likewise, in the second preparation group[ ] 40, 4 third preparation groups [ ][ ] 60 are designated as a single preparation group, and each bit of the second preparation group indicates whether or not a task in an execution preparation state is present in the corresponding group. Furthermore, in the third preparation group[ ][ ] 60, four preparation tables[ ][ ] 80 are designated as a single group, and each bit of the third preparation group indicates whether or not a task in an execution preparation state is present in the corresponding group.

A map table and unmap table used to secure time and space complexity in an embodiment of the present invention are described below.

FIG. 10 is a diagram illustrating a map table and unmap table that are used to insert, select, and delete a task.

Task scheduling overhead $\Delta t$ that determines time determinism in, a real-time OS is the time during which a task is executed by scheduler code, that is, the sum of blocking overhead $\Delta t_b$, unblocking overhead $\Delta t_u$, and selection overhead $\Delta t_s$. The scheduler code is executable code for selecting and managing a task that belongs to tasks in an execution preparation state and that has the highest priority when the execution of a task is stopped or resumed.

If the execution of a task is stopped, a real-time OS needs to change information about some data for managing a task whose execution will be stopped and select a task to be newly executed. The real-time OS defines the time it takes to stop the task as the blocking overhead $\Delta t_b$, and defines the time it takes to select the task to be newly executed as the selection overhead $\Delta t_s$.

Likewise, the time it takes to resume the execution of the task whose execution has been stopped is expressed by the unblocking overhead $\Delta t_u$. When unblocking is performed, context exchange is performed if a task now being executed has a lower priority than a task in an execution preparation state. Even in this case, the selection overhead $\Delta t_s$ required to search for a task that belongs to tasks in an execution preparation state and that has the highest priority is present.

In the time and space-deterministic task scheduling apparatus using a multi-dimensional scheme according to an embodiment of the present invention, task scheduling overhead has space complexity O(1) because the task scheduling overhead has time complexity O(1) regardless of priority and a predetermined data value having a total size of 20 bytes including the map table of 4 bytes and the unmap table of 16 bytes is used.

The map table and the unmap table are described in more detail with reference to FIG. 10. The map table is fixed values that are used to perform task insertion (or bit masking) and task deletion (or unmasking) without the sequential search of a preparation list when the task insertion and deletion are performed at the location of each of 4 bits (0 to 3). The unmap table is a kind of priority transform table in which the location of a task having the highest priority may be searched for without performing the comparison of all tasks within a preparation list in order to search 4-bit values 0 to 15 ($0000_2$ to $1111_2$) for the highest priority task. The time it takes to determine the highest priority based on the defined two constant values is ensured to be a fixed and constant time, and thus time complexity has O(1).

The task insertion unit 120 of the time and space-deterministic task scheduling apparatus 100 using a multi-dimensional scheme according to an embodiment of the present invention is described in detail below.

FIG. 11 is a diagram illustrating pseudo code that is used by the task insertion unit in order to insert a task according to an embodiment of the present invention.

The task insertion unit 120 functions to insert a task having a specific priority P into the preparation group cluster and the preparation table by performing bit masking on the preparation group cluster and preparation table corresponding to the task P having a specific priority.

In this case, the task insertion unit 120 may perform first insertion execution for performing bit masking on the first preparation group in accordance with the value of a map table in which the value of the highest 2 bits of the task P having a specific priority has been indexed, second insertion execution for performing bit masking on the second preparation group in accordance with the value of the map table in which the value of the next higher 2 bits of the task P having a specific priority has been indexed, third insertion execution for performing bit masking on the third preparation group in accordance with the value of the map table in which the value of the next lower 2 bits of the task P having a specific priority has been indexed, and fourth insertion execution for performing bit masking on the preparation table in accordance with the value of the map table in which the value of the lowest 2 bits of the task P having a specific priority has been indexed, based on the map table having an array structure stored in a repository without the sequential search of the preparation list.

In FIG. 11, "RdyGrp" may correspond to the first preparation group, "RdyMidGrp1" may correspond to the second preparation group, "RdyMidGrp2" may correspond to the third preparation group, "RdyTbl" may correspond to the preparation table, and "MapTbl" may correspond to the map table.

Referring to FIG. 11, in the first insertion execution, bit masking is performed on "RdyGrp" using the value of MapTbl with which the value of the highest 2 bits "ZZ" of the 8-bit task priority illustrated in FIG. 6 has been indexed. In the second insertion execution, bit masking is performed on "RdyMidGrp1[ ]" using the value of MapTbl with which the value of the next higher 2 bits "YY" has been indexed. In the third insertion execution, bit masking is performed on RdyMidGrp2[ ][ ] using the value of MapTbl with which the value of the next lower 2 bits "XX" has been indexed. In the fourth insertion execution, bit masking is performed on RdyTbl[ ][ ][ ] using the value of MapTbl with which the value of the lowest 2 bits "WW" has been indexed.

As described above, in the 4D scheme, when a task is inserted, the task is placed in the preparation list, including the preparation group cluster of RdyGrp, RdyMidGrp1[ ] and RdyMidGrp2[ ][ ] and the preparation table of RdyTbl[ ][ ][ ], and the task is executed by the processing of a fixed number of instructions. Accordingly, time complexity has O(1).

A detailed example is described with reference to FIG. 11. First, if a task having a priority of 13 becomes the execution preparation state and is inserted into the preparation list in the initial state in which any task is not in an execution preparation state, the task insertion unit 120 performs the process of inserting the task into the preparation group cluster (i.e., the first preparation group, the second preparation group, and the third preparation group) and the preparation table.

The priority of 13 is "00001101" in a binary number. In the first insertion execution, RdyGrp="00000000" is present on the left, and MapTbl[0]="0x01" having "00" obtained by right shifting the priority "00001101" by 6 bits, that is, the highest 2 bits "ZZ" of the priority, as an index is present on the right. RdyGrp="00000001" is obtained by bit-masking "0x01" to RdyGrp.

Next, in the second insertion execution, RdyMidGrp1[0]="00000000" having an already calculated value as an index is present on the left, and MapTbl[0] having "00" obtained by right shifting "00000000" (i.e., a value obtained by performing an AND operation on "00001101" and "0x30", that is, "00110000") by 4 bits, that is, the next higher 2 bits "YY" of the priority, as an index is present on the right. RdyMidGrp1[0]="00000001" is obtained by bit-masking MapTbl[0] to RdyMidGrp1[0].

Next, in the third insertion execution, RdyMidGrp2[0][0]="00000000" having an already calculated value as an index is present on the left, and MapTbl[3]="0x08" having "11" obtained by right shifting "00001100" (i.e., a value obtained by performing an AND operation on "00001101" and "0x0C", that is, "00001100") by 2 bits, that is, the next lower 2 bits XX of the priority, as an index is present on the right. RdyMidGrp2[0][0]="00001000" is obtained by bit-masking "0x08" to RdyMidGrp2[0][0].

Finally, in the fourth insertion execution, RdyTbl[0][0][3]="00000000" is present on the left, and MapTbl[1]="0x02" having "00000001" (i.e., a value obtained by performing an AND operation on "00001101" and "0x03", that is, "00000011"), that is, the lowest two bits "WW" of the priority, as an index, is present on the right. RdyTbl[0][0][3]="00000010" is obtained by bit-masking "0x02" to RdyTbl[0][0][3].

As described above, the task insertion unit 120 completes an insertion operation at a fixed and constant time using two bits of the priority of a task to be inserted into a preparation list as the respective indices of a preparation group and a preparation table.

The task selection unit 130 of the time and space-deterministic task scheduling apparatus 100 using a multi-dimensional scheme according to an embodiment of the present invention 100 is described in detail below.

FIG. 12 is a diagram illustrating pseudo code that is used by the task selection unit in order to select a task according to an embodiment of the present invention.

The task selection unit 130 functions to select a task Q having the highest priority in the preparation table in accordance with a change in the preparation table.

In this case, the task selection unit 130 may perform first selection execution for calculating the value of the highest 2 bits of the task Q having the highest priority in accordance with the value of an unmap table in which the value of the first preparation group has been indexed, second selection execution for calculating the value of the next higher 2 bits of the task Q having the highest priority in accordance with the value of the unmap table in which the value of the second preparation group has been indexed, third selection execution for calculating the value of the next lower 2 bits of the task Q having the highest priority in accordance with the value of the unmap table in which the value of the third preparation group has been indexed, fourth selection execution for calculating the value of the lowest 2 bits of the task Q having the highest priority in accordance with the value of the unmap table in which the preparation table value has been indexed, and fifth selection execution for determining a task having the highest priority based on the value of the highest 2 bits, the value of the next higher 2 bits, the value of the next lower 2 bits, and the value of the lowest 2 bits, based on the unmap table, that is, a priority transform table for detecting the task Q having the highest priority without performing a comparison on all the tasks of the preparation list.

More specifically, in the fifth selection execution, the task having the highest priority may be determined by adding a value obtained by left shifting the value of the highest 2 bits by 6 bits, a value obtained by left shifting the value of the next higher 2 bits by 4 bits, a value obtained by left shifting the value of the next lower 2 bits by 2 bits, and the value of the lowest 2 bits.

In FIG. 12, "RdyGrp" may correspond to the first preparation group, "RdyMidGrp1" may correspond to the second preparation group, "RdyMidGrp2" may correspond to the third preparation group, "RdyTbl" may correspond to the preparation table, and "UnMapTbl" may correspond to the unmap table.

Referring to FIG. 12, in the first selection execution, the value of "z", that is, the value of the highest 2 bits "ZZ" of the priority, is calculated using the value of UnMapTbl with which the value of RdyGrp has been indexed. In the second selection execution, the value of "y", that is, the value of the next higher 2 bits "YY" of the priority, is calculated using the value of UnMapTbl with which the value of RdyMidGrp1[z] has been indexed. In the third selection execution, the value of "x", that is, the value of the next lower 2 bits XX of the priority, is calculated using the value of UnMapTbl with which the value of RdyMidGrp2[z][y] has been indexed. In the fourth selection execution, the value of "w", that is, the value of the lowest 2 bits "WW" of the priority, is calculated using the value of UnMapTbl with which the value of RdyTbl[z][y][w] has been indexed. In the fifth selection execution, the value of the highest priority is calculated based on the values calculated in the first selection execution to the fourth selection execution.

As described above, the task selection unit 130 selects a task having the highest priority by processing a fixed number of instructions using UnMapTbl. Accordingly, time complexity has 0(1).

A detailed example is described below with reference to FIG. 12. In order to determine a task having the highest priority in the preparation table, the task selection unit 130 may complete an operation at a fixed and constant time using UnMapTbl, that is, the priority transform table.

In the case where a task having a priority of 13 has the highest priority, in the first selection execution, with respect to the highest two bits "ZZ" of the priority of the task, UnMapTbl[1]="0" with RdyGrp="00000001" on the right being an index, and z="0".

Furthermore, in the second selection execution, with respect to the next higher 2 bits "YY", UnMapTbl[1]="0" with RdyMidGrp1[0]="00000001" on the right being an index, and y="0."

Furthermore, in the third selection execution, with respect to the next lower 2 bits XX, UnMapTbl[8]="3" with RdyMidGrp2[0][0]="00001000" on the right being an index, and x="3."

Furthermore, in the fourth selection execution, with respect to the lowest 2 bits "WW," UnMapTbl[2]="1" with RdyTbl[0][0][3]="00000010" on the right being an index, and w="1."

Furthermore, in the fifth selection execution, the highest priority R has a value of 13, that is, the sum of a value "0"

obtained by left shifting the value of "z" by 6 bits, a value "0" obtained by left shifting the value of "y" by 4 bits, a value "12" obtained by left shifting the value of "x" by 2 bits, and "1", that, is, the value of "w."

As described above, the execution time of the task selection unit 130 for selecting a task having the highest priority is a fixed and constant time.

The task execution unit 140 of the time and space-deterministic task scheduling apparatus 100 using a multi-dimensional scheme according to an embodiment of the present invention is described in detail below.

The task execution unit 140 functions to assign a CPU to the task Q having the highest priority and to execute the task Q having the highest priority.

More specifically, the task execution unit 140 records the time for which a task has been executed using an assigned CPU, and assigns a CPU to a task selected by the task selection unit 130 so that the selected task is executed.

That is, if an input from the task selection unit 130 is present, that is, if a task having a higher priority than a task now being executed is present in a preparation table, the task execution unit 140 stores the execution time of the task now being executed and information about the task, provides notification to the task insertion unit 120 so that it adds a task that had been executed (i.e., a task that has been deprived of a CPU use right) to the preparation table, and assigns a CPU use right to the task having the highest priority that has been selected by the task selection unit 130.

The task deletion unit 150 of the time and space-deterministic task scheduling apparatus 100 using a multi-dimensional scheme according to an embodiment of the present invention is described in detail below.

FIG. 13 is a diagram illustrating pseudo code that is used by the task deletion unit in order to delete a task according to an embodiment of the present invention.

The task deletion unit 150 functions to delete a task R to be deleted, that is, a task whose execution has been terminated or stopped, from the preparation list.

In this case, the task deletion unit 150 may perform first deletion execution for unmasking the preparation table in accordance with the value of a map table in which the value of the lowest 2 bits of the task R to be deleted has been indexed, second deletion execution for unmasking the third preparation group in accordance with the value of the map table in which the value of the next lower 2 bits of the task R to be deleted has been indexed if a result of the first deletion execution is 0, third deletion execution for unmasking the second preparation group in accordance with the value of the map table in which the value of the next higher 2 bits of the task R to be deleted has been indexed if a result of the second deletion execution is 0, and fourth deletion execution for unmasking the first preparation group in accordance with the value of the map table in which the value of the highest 2 bits of the task R to be deleted has been indexed if a result of the third deletion execution is 0, based on the map table having an array structure stored in a repository without the sequential search of the preparation list.

In FIG. 13, "RdyGrp" may correspond to the first preparation group, "RdyMidGrp1" may correspond to the second preparation group, "RdyMidGrp2" may correspond to the third preparation group, "RdyTbl" may correspond to the preparation table, and "MapTbl" may correspond to the map table.

Referring to FIG. 13, the deletion of a task performed by the task deletion unit 150 is performed in the order opposite the order in which the task has been inserted. In the first deletion execution, RdyTbl[ ][ ][ ] is unmasked based on the value of MapTbl with which the value of the lowest 2 bits "WW" of a priority "p" has been indexed and whether or not a result of the unmasking is "0" is determined. If, as a result of the determination, it is determined that the result is 0, in the second deletion execution, the RdyMidGrp2[ ][ ] of a corresponding group is unmasked based on the value of MapTbl, with which the value of the next lower 2 bits "XX" of the priority "p" has been indexed. Whether or not a result of the unmasking in the second deletion execution is "0" is determined. If, as a result of the determination, it is determined that, the result of the determination is 0, in the third deletion execution, the RdyMidGrp1[ ] of a corresponding group is unmasked based on the value of MapTbl with which the value of the next higher 2 bits "YY" has been indexed and whether or not a result of the unmasking in the third deletion execution is "0" is determined. If, as a result of the determination, it is determined that the result is 0, in the fourth deletion execution, the RdyGrp of a corresponding group is unmasked based on the value of MapTbl with which the value of the highest 2 bits "ZZ" of the priority "p" has been indexed.

As described above, the task deletion unit 150 deletes a task from the preparation list by processing a fixed number of instructions. Accordingly, time complexity has 0(1).

A detailed example is described below with reference to FIG. 13. If the execution of a task having a priority of 13 is stopped, the task deletion unit 150 deletes a task to be deleted from the preparation group cluster (i.e., the first preparation group, the second preparation group, and the third preparation group) and the preparation table.

In the first deletion execution, when unmasking is performed on RdyTbl[0][0][3]="00000010" on the left and MapTbl[1]="0x02", RdyTbl[0][0][3]="00000000" is obtained. Accordingly, condition "0" is satisfied, and thus the second deletion execution is performed.

In the second deletion execution, when unmasking is performed on RdyMidGrp2[0][0]="00001000" and MapTbl[3]="0x08", RdyMidGrp2[0][0]="00000000" is obtained. Accordingly, condition "0" is satisfied, and thus the third deletion execution is performed.

Thereafter, in the third deletion execution, when unmasking is performed on RdyMidGrp1[0]="00000001" and MapTbl[0]="0x01", RdyMidGrp1[0]="00000000" is obtained. Accordingly, condition "0" is satisfied, and thus the fourth deletion execution is performed.

Next, in the fourth deletion execution, the task is deleted from the preparation group and the preparation table by performing unmasking on RdyGrp="00000001" and MapTbl[0]="0x01."

As described above, the task deletion unit 150 deletes a task from the preparation table and the preparation group at a fixed and constant time in the order opposite the order in which the task has been inserted.

A time and space-deterministic task scheduling method using a multi-dimensional scheme according to an embodiment of the present invention is described below. As described above, descriptions identical to those given with reference to the time and space-deterministic task scheduling apparatus 100 using a multi-dimensional scheme according to the embodiment of the present invention are omitted for simplicity.

Figure 14:
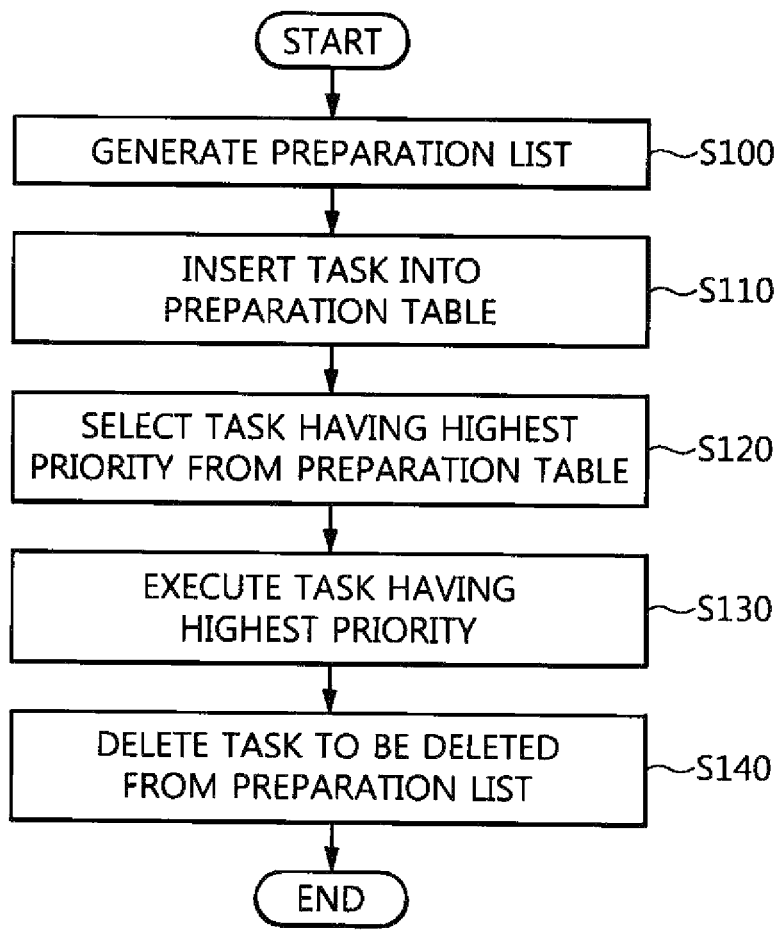
FIG. 14 is a flowchart illustrating a time and space-deterministic task scheduling method using a multi-dimensional scheme according to an embodiment of the present invention.

FIG. 14 is a flowchart illustrating a time and space-deterministic task scheduling method using a multi-dimensional scheme according to an embodiment of the present invention.

Referring to FIG. 14, the time and space-deterministic task scheduling method using a multi-dimensional scheme according to this embodiment of the present invention may include generating, by the preparation list generation unit 110, a preparation list, including a preparation table having an array structure configured to have each bit formed of a binary number indicative of the priority of a task and a preparation group cluster formed of a plurality of preparation groups, each including bits corresponding to the respective binary numbers of the preparation table, and configured to have an upper and lower dimension relationship between the plurality of preparation groups at step S100; performing, by the task insertion unit 120, bit masking on the preparation group cluster and preparation table corresponding to a task P having a specific priority and inserting the task into the preparation group cluster and the preparation table at step S110; selecting, by the task selection unit 130, a task Q having the highest priority in the preparation table in accordance with a change in the preparation table at step S120; assigning, by the task execution unit 140, a CPU to the task Q having the highest priority and executing the task Q having the highest priority at step S130; and deleting, by the task deletion unit 150, a task R to be deleted, that is, a task whose execution has been terminated or stopped, from the preparation list at step S140.

The time and space-deterministic task scheduling apparatus and method using a multi-dimensional scheme according to some embodiments of the present invention have the advantage of implementing a time and space-deterministic task scheduler using a multi-dimensional scheme, in which time and space complexity is always O(1) regardless of the extension of priorities in a system having considerably limited hardware resources, such as a wearable PC.

The time and space-deterministic task scheduling apparatus and method using a multi-dimensional scheme according to some embodiments of the present invention have the advantage of ensuring that space complexity of O(1) because only a constant memory space is requested without memory overhead attributable to the extension of priorities and the advantage of being able to always detect the location of a task, to which the highest priority has been assigned, at a fixed and constant time because a fixed instruction is always executed regardless of the number of tasks when task scheduling is performed.

As described above, the time and space-deterministic task scheduling apparatus (100) and method using a multi-dimensional scheme according to embodiments of the present invention are not limited and applied to the configurations and methods of the aforementioned embodiments, and all or some of the embodiments may be selectively combined and configured so that the embodiments may be modified in various ways.

What is claimed is:

1. A time and space-deterministic task scheduling apparatus using a multi-dimensional scheme, comprising:
a preparation list generation unit configured to generate a preparation list, including a preparation table having an array structure configured to have each bit formed of a binary number indicative of a priority of a task, and also including a preparation group cluster configured to include a plurality of preparation groups, each including bits corresponding to the respective binary numbers of the preparation table, and also configured to have an upper and lower dimension relationship between the plurality of preparation groups; and
a task insertion unit configured to perform bit masking on the preparation group cluster and the preparation table corresponding to a task P having a specific priority and to thus insert the task into the preparation group cluster and the preparation table,
wherein the task P having a specific priority includes a bit indicative of a location in each of the plurality of preparation groups having an upper and lower dimension relationship and a bit indicative of a location in the preparation table,
wherein the preparation list generation unit is further configured to:
form a first preparation group, that is, a preparation group having a highest dimension of the preparation group cluster, using 4 bits;
form a second preparation group corresponding to a next higher dimension, that is, a lower dimension of the first preparation group formed of 4 bits, with respect to each bit of the first preparation group;
form a third preparation group corresponding to a next lower dimension, that is, a lower dimension of the second preparation group formed of 4 bits, with respect to each bit of the second preparation group; and
generate the preparation list by setting a specific bit of the first preparation group to 1 in order to indicate that a task in an execution preparation state is present in the first preparation group if a value of any one of the bits of the second preparation group, the third preparation group and the preparation table corresponding to the specific bit of the first preparation group is 1,
wherein the preparation list generation unit is further configured to classify the task P, having a specific priority formed of 8 bits, into pairs of 2 bits, and to generate the preparation list so that the task P is mapped to each of the first preparation group, the second preparation group, the third preparation group and the preparation table in accordance with a value of each of four 2 bits, and
wherein the task insertion unit is further configured to perform:
based on the map table having an array structure stored in a repository in order to enable performance without requiring sequential search of the preparation list,
first insertion execution for performing bit masking on the first preparation group in accordance with a value of the map table in which a value of highest 2 bits of the task P having a specific priority has been indexed;
second insertion execution for performing bit masking on the second preparation group in accordance with a value of the map table in which a value of next higher 2 bits of the task P having a specific priority has been indexed;
third insertion execution for performing bit masking on the third preparation group in accordance with a value of the map table in which a value of next lower 2 bits of the task P having a specific priority has been indexed; and
fourth insertion execution for performing bit masking on the preparation table in accordance with a value of the map table in which a value of lowest 2 bits of the task P having a specific priority has been indexed.

2. The time and space-deterministic task scheduling apparatus of claim 1, further comprising a task selection unit configured to select a task Q having a highest priority from the preparation table in accordance with a change in the preparation table.

3. The time and space-deterministic task scheduling apparatus of claim 2, wherein the task selection unit is further configured to perform:
based on an unmap table that is a priority transform table for detecting the task Q having a highest priority in order to perform execution without performing comparison between all tasks of the preparation list,
first selection execution for calculating a value of highest 2 bits of the task Q having the highest priority in accordance with a value of the unmap table in which a value of the first preparation group has been indexed;

second selection execution for calculating a value of next higher 2 bits of the task Q having the highest priority in accordance with a value of the unmap table in which a value of the second preparation group has been indexed;

third selection execution for calculating a value of next lower 2 bits of the task Q having the highest priority in accordance with a value of the unmap table in which a value of the third preparation group has been indexed;

fourth selection execution for calculating a value of lowest 2 bits of the task Q having the highest priority in accordance with a value of the unmap table in which the preparation table value has been indexed; and fifth selection execution for determining a task having a highest priority based on the value of the highest 2 bits, the value of the next higher 2 bits, the value of the next lower 2 bits, and the value of the lowest 2 bits.

4. The time and space-deterministic task scheduling apparatus of claim 3, wherein the fifth selection execution is configured such that the task having a highest priority is determined by adding a value obtained by left shifting the value of the highest 2 bits by 6 bits, a value obtained by left shifting the value of the next higher 2 bits by 4 bits, a value obtained by left shifting the value of the next lower 2 bits by 2 bits, and the value of the lowest 2 bits.

5. The time and space-deterministic task scheduling apparatus of claim 4, further comprising a task execution unit configured to assign a CPU to the task Q having a highest priority, and to execute the task Q having a highest priority.

6. The time and space-deterministic task scheduling apparatus of claim 1, further comprising a task deletion unit configured to delete a task R, that is, a task whose execution has been terminated or stopped, from the preparation list.

7. The time and space-deterministic task scheduling apparatus of claim 6, wherein the task deletion unit is further configured to perform:

based on the map table having an array structure stored in a repository in order to enable performance without requiring sequential search of the preparation list, first deletion execution for unmasking the preparation table in accordance with a value of the map table in which a value of lowest 2 bits of the task R to be deleted has been indexed;

second deletion execution for unmasking the third preparation group in accordance with a value of the map table in which a value of next lower 2 bits of the task R to be deleted has been indexed if a result of the first deletion execution is 0;

third deletion execution for unmasking the second preparation group in accordance with a value of the map table in which a value of next higher 2 bits of the task R to be deleted has been indexed if a result of the second deletion execution is 0; and fourth deletion execution for unmasking the first preparation group in accordance with a value of the map table in which a value of the highest 2 bits of the task R to be deleted has been indexed if a result of the third deletion execution is 0.

8. A time and space-deterministic task scheduling method using a multi-dimensional scheme, comprising:

generating, by a preparation list generation unit, a preparation list, including a preparation table having an array structure configured to have each bit formed of a binary number indicative of a priority of a task, and also including a preparation group cluster configured to include a plurality of preparation groups, each including bits corresponding to the respective binary numbers of the preparation table, and also configured to have an upper and lower dimension relationship between the plurality of preparation groups; and performing, by a task insertion unit, bit masking on the preparation group cluster and the preparation table corresponding to a task P having a specific priority and thus inserting the task into the preparation group cluster and the preparation table;

wherein the task P having a specific priority comprises a bit indicative of a location in each of the plurality of preparation groups having an upper and lower dimension relationship and a bit indicative of a location in the preparation table, wherein generating the preparation list comprises:

forming a first preparation group, that is, a preparation group having a highest dimension of the preparation group cluster, using 4 bits;

forming a second preparation group corresponding to a next higher dimension, that is, a lower dimension of the first preparation group formed of 4 bits, with respect to each bit of the first preparation group;

forming a third preparation group corresponding to a next lower dimension, that is, a lower dimension of the second preparation group formed of 4 bits, with respect to each bit of the second preparation group; and generating the preparation list by setting a specific bit of the first preparation group to 1 so that a task in an execution preparation state is present in the first preparation group if a value of any one of the bits of the second preparation group, the third preparation group, and the preparation table corresponding to the specific bit of the first preparation group is 1, wherein generating the preparation list comprises classifying the task P, having a specific priority formed of 8 bits, into pairs of 2 bits, and generating the preparation list so that the task P is mapped to each of the first preparation group, the second preparation group, the third preparation group and the preparation table in accordance with a value of each of four 2 bits, and wherein inserting the task into the preparation group cluster and the preparation table comprises:

based on the map table having an array structure stored in a repository in order to enable performance without requiring sequential search of the preparation list, performing first insertion execution for performing bit masking on the first preparation group in accordance with a value of the map table in which a value of highest 2 bits of the task P having a specific priority has been indexed;

performing second insertion execution for performing bit masking on the second preparation group in accordance with a value of the map table in which a value of next higher 2 bits of the task P having a specific priority has been indexed;

performing third insertion execution for performing bit masking on the third preparation group in accordance with a value of the map table in which a value of next lower 2 bits of the task P having a specific priority has been indexed; and performing fourth insertion execution for performing bit masking on the preparation table in accordance with a value of the map table in which a value of lowest 2 bits of the task P having a specific priority has been indexed.

9. The time and space-deterministic task scheduling method of claim 8, further comprising selecting a task Q having a highest priority from the preparation table in accordance with a change in the preparation table.

10. The time and space-deterministic task scheduling method of claim 9, wherein selecting the task Q comprises:
- based on an unmap table that is a priority transform table for detecting the task Q having the highest priority in order to perform execution without performing comparison between all tasks of the preparation list,
- performing first selection execution for calculating a value of highest 2 bits of the task Q having the highest priority in accordance with a value of the unmap table in which a value of the first preparation group has been indexed;
- performing second selection execution for calculating a value of next higher 2 bits of the task Q having the highest priority in accordance with a value of the unmap table in which a value of the second preparation group has been indexed;
- performing third selection execution for calculating a value of next lower 2 bits of the task Q having the highest priority in accordance with a value of the unmap table in which a value of the third preparation group has been indexed;
- performing fourth selection execution for calculating a value of lowest 2 bits of the task Q having the highest priority in accordance with a value of the unmap table in which the preparation table value has been indexed; and
- performing fifth selection execution for determining a task having a highest priority based on the value of the highest 2 bits, the value of the next higher 2 bits, the value of the next lower 2 bits, and the value of the lowest 2 bits.

11. The time and space-deterministic task scheduling method of claim 10, wherein performing the fifth selection execution comprises determining the task having a highest priority by adding a value obtained by left shifting the value of the highest 2 bits by 6 bits, a value obtained by left shifting the value of the next higher 2 bits by 4 bits, a value obtained by left shifting the value of the next lower 2 bits by 2 bits, and the value of the lowest 2 bits.

12. The time and space-deterministic task scheduling method of claim 11, further comprising, after selecting the task Q, assigning, by a task execution unit, a CPU to the task Q having a highest priority, and executing, by the task execution unit, the task Q having a highest priority.

13. The time and space-deterministic task scheduling method of claim 8, further comprising deleting, by a task deletion unit, a task R to be deleted, that is, a task whose execution has been terminated or stopped, from the preparation list.

14. The time and space-deterministic task scheduling method of claim 13, wherein deleting the task R comprises:
- based on the map table having an array structure stored in a repository in order to enable performance without requiring sequential search of the preparation list,
- performing first deletion execution for unmasking the preparation table in accordance with a value of the map table in which a value of lowest 2 bits of the task R to be deleted has been indexed;
- performing second deletion execution for unmasking the third preparation group in accordance with a value of the map table in which a value of next lower 2 bits of the task R to be deleted has been indexed if a result of the first deletion execution is 0;
- performing third deletion execution for unmasking the second preparation group in accordance with a value of the map table in which a value of next higher 2 bits of the task R to be deleted has been indexed if a result of the second deletion execution is 0; and
- performing fourth deletion execution for unmasking the first preparation group in accordance with a value of the map table in which a value of the highest 2 bits of the task R to be deleted has been indexed if a result of the third deletion execution is 0.

* * * * *